US007852047B2

(12) United States Patent
Osamura

(10) Patent No.: US 7,852,047 B2
(45) Date of Patent: Dec. 14, 2010

(54) DISCONNECTION DETECTION DEVICE OF ASSEMBLED BATTERY SYSTEM AND DISCONNECTION DETECTION METHOD OF SAME

(75) Inventor: Nobuyoshi Osamura, Nishio (JP)

(73) Assignee: DENSO CORPORATION, Kariya (JP)

( * ) Notice: Subject to any disclaimer, the term of this patent is extended or adjusted under 35 U.S.C. 154(b) by 226 days.

(21) Appl. No.: 12/232,480

(22) Filed: Sep. 18, 2008

(65) Prior Publication Data
US 2009/0079396 A1 Mar. 26, 2009

(30) Foreign Application Priority Data
Sep. 20, 2007 (JP) ............... 2007-243713
Mar. 21, 2008 (JP) ............... 2008-073681

(51) Int. Cl.
H02J 7/04 (2006.01)
(52) U.S. Cl. ............... 320/165; 320/116; 320/120; 320/122; 320/134; 320/136; 320/DIG. 13; 320/DIG. 15; 324/433; 324/520; 324/522
(58) Field of Classification Search ............... 320/116, 320/120, 122, 134, 136, 165, DIG. 13, DIG. 15; 324/433, 520, 522
See application file for complete search history.

(56) References Cited
U.S. PATENT DOCUMENTS

| 6,255,803 | B1 | 7/2001 | Ishihara et al. | |
| 6,255,826 | B1 | 7/2001 | Ohsawa et al. | |
| 6,741,437 | B2 * | 5/2004 | Vanhee | 361/57 |
| 6,836,095 | B2 * | 12/2004 | Fogg | 320/128 |
| 6,977,483 | B2 | 12/2005 | Iwashima | |
| 2004/0036446 | A1 * | 2/2004 | Iwashima | 320/116 |
| 2004/0196007 | A1 * | 10/2004 | Iwashima et al. | 320/134 |
| 2006/0220461 | A1 | 10/2006 | Miyamoto | |
| 2007/0114973 | A1 | 5/2007 | Miyamoto | |

FOREIGN PATENT DOCUMENTS

| JP | A-2001-157367 | 6/2001 |
| JP | A-2001-286065 | 10/2001 |
| JP | A-2001-337125 | 12/2001 |
| JP | A-2003-061254 | 2/2003 |
| JP | A-2004-180395 | 6/2004 |
| JP | A-2005-168118 | 6/2005 |

(Continued)

OTHER PUBLICATIONS

Notice of Rejection mailed Oct. 6, 2009 in corresponding Japanese patent application No. 2008-073681 (and English translation).

Primary Examiner—Edward Tso
Assistant Examiner—Manuel Hernandez
(74) Attorney, Agent, or Firm—Posz Law Group, PLC

(57) ABSTRACT

Upon detecting a disconnection, a current detection circuit supplies a detection current to connection lines between each cell and the corresponding voltage monitoring circuit. The detection current is larger than a consumption current flowing via each voltage monitoring circuit in a normal state. When the disconnection occurs, a diode changes a route in which the detection current flows so as to reverse an electric potential relation between a positive-side power line and a negative-side power line of the corresponding cell and a reverse detection circuit detects the reverse of the electric potential relation to output a disconnection detection signal.

6 Claims, 17 Drawing Sheets

FOREIGN PATENT DOCUMENTS

| | | |
|---|---|---|
| JP | A-2006-029923 | 2/2006 |
| JP | A-2006-050784 | 2/2006 |
| JP | A-2006-153758 | 6/2006 |
| JP | A-2006-185685 | 7/2006 |
| JP | A-2007-259667 | 10/2007 |

* cited by examiner

| FIG. 2A |
| FIG. 2B |

| FIG. 3A |
| FIG. 3B |
| FIG. 3C |

| FIG. 5A |
| FIG. 5B |

DISCONNECTION DETECTION OUTPUT

DISCONNECTION DETECTION DEVICE OF ASSEMBLED BATTERY SYSTEM AND DISCONNECTION DETECTION METHOD OF SAME

CROSS-REFERENCE TO RELATED APPLICATIONS

The present application is based on Japanese Patent Application No. 2007-243713, filed on Sep. 20, 2007, and Japanese Patent Application No. 2008-073681 filed on Mar. 21, 2008 the entire contents of both of which are incorporated herein by reference.

BACKGROUND INVENTION

1. Field of the Invention

The present invention relates to a device and method for detecting a disconnection of an assembled battery system constructed by connecting a plurality of secondary battery cells in series and, more particularly, to monitoring and detecting the disconnection between each cell.

2. Detailed Description of Related Art

In association with a device for monitoring a charge/discharge state of an assembled battery, such as is described in JP2004-1040989A, a disconnection between the assembled battery and the monitoring device is detected. Serial circuits each having a resistor element R and FET_Q are connected in parallel to the respective cells S. Upon detecting the disconnection, in a set of two, upper and lower cells, the upper FET turns off and the lower FET turns on. Then, when the common line between the two cells, such as the upper negative side cell and the lower positive side cell, is disconnected, the abnormality detection circuit at the upper side detects an overcharge and the abnormality detection circuit at the lower side detects an over-discharge. When the detection state is acquired, the disconnection can be detected.

However, disadvantages arise according to the device described in JP2004-104989A. For example, in a case where a total voltage of the two cells is less than an over-charge detection threshold value due to the low cell voltage, the disconnection can not be detected. In a case where the assembled battery and the monitoring device are designed such that the cell voltage varies in a range of 2 V to 4V at a normal time, the over-charge is detected when the cell voltage is 4.5V and the over-discharge is detected when the cell voltage is 1.5V, since a sum of the voltage is made 4V if the voltage of each cell is 2V, the over-charge resulting from, for example, a disconnection, can not be detected.

Even when the cell voltage is high, the disconnection of the power lines at the uppermost side, such as at the positive side of cell Sn, and at the lowermost side, such as at the negative side of cell S1, can not be detected. It should be noted that in such a situation, while the over-discharge can be detected, the disconnection can not be discerned. Thus, as described, whether the detection of the disconnection is possible disadvantageously depends on the condition.

SUMMARY OF THE INVENTION

The invention is made in view of the forgoing and it is an object of the invention to provide a disconnection detection device and method for detection of a disconnection of an assembled battery system that can perform disconnection detection on a broader scale than previously possible.

According to a disconnection detection device of an assembled battery system in accordance with a first aspect, upon detecting the disconnection between an assembled battery and a monitoring circuit, current supplying means for detection supplies a detection current larger than a consumption current flowing via the monitoring circuit, to a connection line between the cell and the monitoring circuit. When the disconnection occurs, current route changing means changes a route in which the detection current flows in such a manner as to reverse an electric potential relation between a positive-side power line and a negative-side power line of the corresponding cell. Therefore, disconnection detecting means then detects the reversal of the electric potential relation to output a disconnection detection signal.

Even if the current supplying means for detection supplies the detection current at a normal time when a disconnection between the cell and the monitoring circuit has not occurred, the current route changing means is not activated and therefore, the disconnection detecting means does not detect the reverse of the electric potential relation. When disconnection occurs between any of the cells and the monitoring circuit, the electric potential relation between the positive-side power line and the negative-side power line is reversed since the current route changing means is activated. In such a case, since the disconnection detecting means detects the reverse of the electric potential relation for each cell, the disconnection can be detected regardless of an increase or a decrease of the terminal voltage of the cell. Further, even in a case where the positive-side power line of the uppermost cell is disconnected, the disconnection can likewise be detected.

According to a disconnection detection device of an assembled battery system in accordance with a second aspect, in a case where the number of cells is $2n$, where n is natural number, n portions of the current supplying means for detection may be connected in parallel to n serial cells such that terminals to be connected to the cells differ from each other. According to such a construction, one portion of the current supplying means for detection can supply the detection current to the two cells to minimize the number of portions associated with the current supplying means. In addition, in a case where all the current supplying means for detection are made to operate simultaneously, since the detection current flows in such a manner as to be dispersed to each connection line, the entire disconnection detection device can be constructed in a balanced way.

According to a disconnection detection device of an assembled battery system in accordance with a third aspect, the current route changing means may be formed of a diode in which a cathode is connected to the positive electrode side of the cell. Therefore, by supplying the detection current through the diode from the negative side of the cell where the disconnection occurs to the positive side thereof, the electric potential relation between the positive side and the negative side of the cell can be easily reversed.

According to a disconnection detection device of an assembled battery system in a fourth aspect, when the disconnection between the corresponding cells and the cell arranged at the maximum electric potential side and the cell arranged at the minimum electric potential side of the assembled battery occurs, the current route changing means may change a route of the current flowing between the positive-side power line and the negative-side power line of the corresponding cell in such a manner as to reverse an electric potential relation between both of the power lines and the disconnection detection means may detect the reverse of the electric potential relation to output a disconnection detection signal.

That is, JP2004-104989A described above, has a disadvantage in that the disconnection of the power lines in the uppermost electric potential and the lowermost electric potential of the assembled battery can not be detected. Accordingly, if it is possible to detect at least the disconnection of the power lines in the uppermost electric potential and the lowermost electric potential of the assembled battery, the above problem can be solved.

According to a disconnection detection device of an assembled battery system in a fifth aspect, the disconnection detecting means may include positive-side current conversion means for converting a voltage of the positive-side power line of the corresponding cell into a positive-side current, negative-side current conversion means for converting a voltage of the negative-side power line of the corresponding cell into a negative-side current and current comparison means for comparing a magnitude of the positive-side current with a magnitude of the negative-side current. When the comparison result shows that the negative-side current is larger than the positive-side current, the disconnection detecting means outputs a disconnection detection signal. That is, since a case of "negative-side current>positive-side current" corresponds to a case of "negative-side voltage>positive-side voltage", a reversal of the electric potential, that can correspond to a disconnection can be detected by comparing the positive-side and negative-side current values.

According to a disconnection detection device of an assembled battery system in a sixth aspect, the positive-side current conversion means may be formed of a first current mirror circuit, the negative-side current conversion means may be formed of a second current mirror circuit and the current comparison means may be formed of a third current mirror circuit in which a third mirror current determined by a second mirror current is supplied to a mirror-side transistor of the first current mirror circuit and an output transistor to which a current is supplied from the negative-side power line. In addition, the conduction of the output transistor is controlled to be made by current flowing in a common connection point between a transistor constituting the third current mirror circuit and a transistor constituting the first current mirror circuit.

That is, the first mirror current by the first current mirror circuit corresponds to the positive-side current and the third mirror current by the third current mirror circuit corresponds to the negative-side current. In addition, the current flowing into or flowing out from the common connection point between the transistor constituting the third current mirror circuit and the transistor constituting the first current mirror circuit corresponds to a difference between the negative-side current and the positive-side current. Therefore, if a current ratio between the first mirror current and the third mirror current is set in such a manner that the conduction state of the output transistor changes when "negative-side current>positive-side current", it is possible to control the current supply for outputting the disconnection detection signal through the output transistor.

According to a disconnection detection device of an assembled battery system in a seventh aspect, a detection transistor may be provided between the first and second current mirror circuits and the power line lower in electric potential than the negative-side power line. Conduction of the detection transistor is made in a case of performing the disconnection detection. Consequently, since the first to third current mirror circuits operate only in a case where the disconnection detection is performed to supply the mirror current, it is possible to restrict the current consumption.

BRIEF DESCRIPTION OF THE DRAWINGS

Other objects, features, and advantages will become more apparent from the following detailed description made with reference to the accompanying drawings, in which like portions are designated by like reference numbers and in which.

DETAILED DESCRIPTION OF THE EXEMPLARY EMBODIMENTS

Hereinafter, various exemplary embodiments of the invention will be explained with reference to the drawings.

First Embodiment

Figures 1, 1A, 1B:
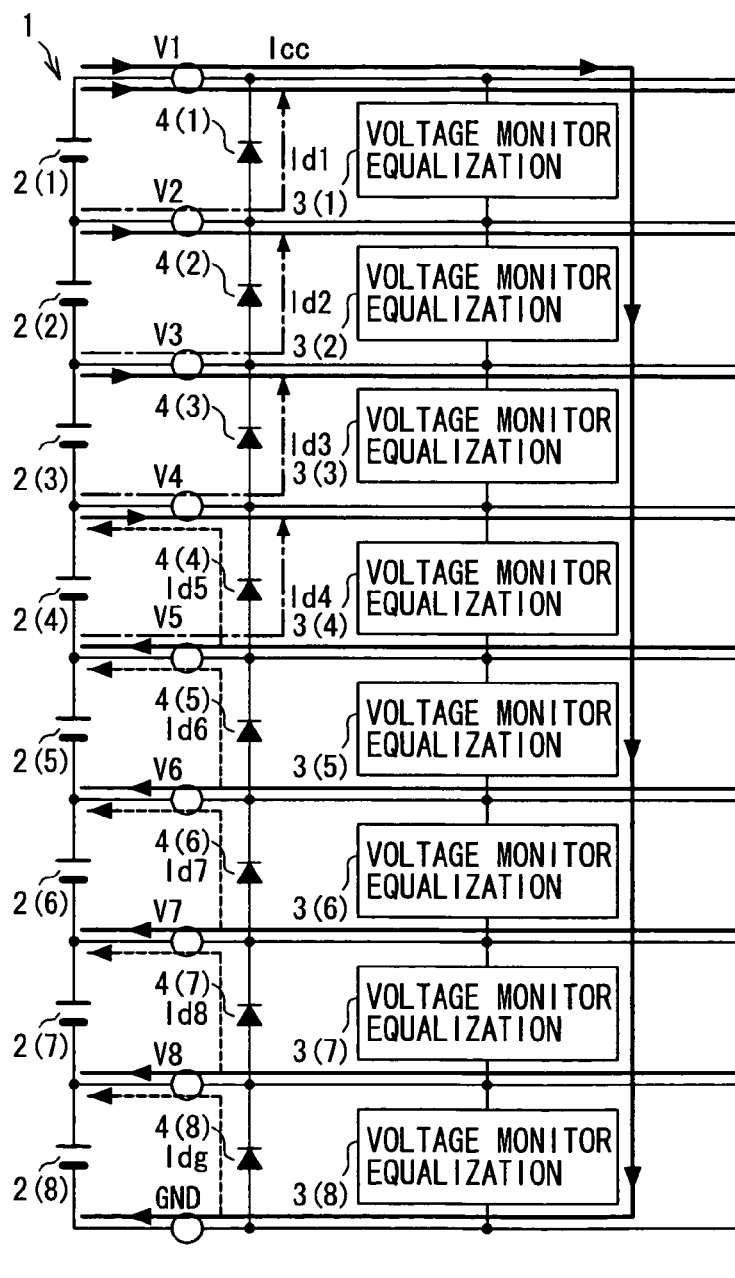
FIG. 1A is a block diagram illustrating an exemplary construction of a disconnection detecting device in a first embodiment.
FIG. 1B is a block diagram further illustrating an exemplary construction of a disconnection detecting device including reverse detection and current control circuit in a first embodiment.
Figure 1B:
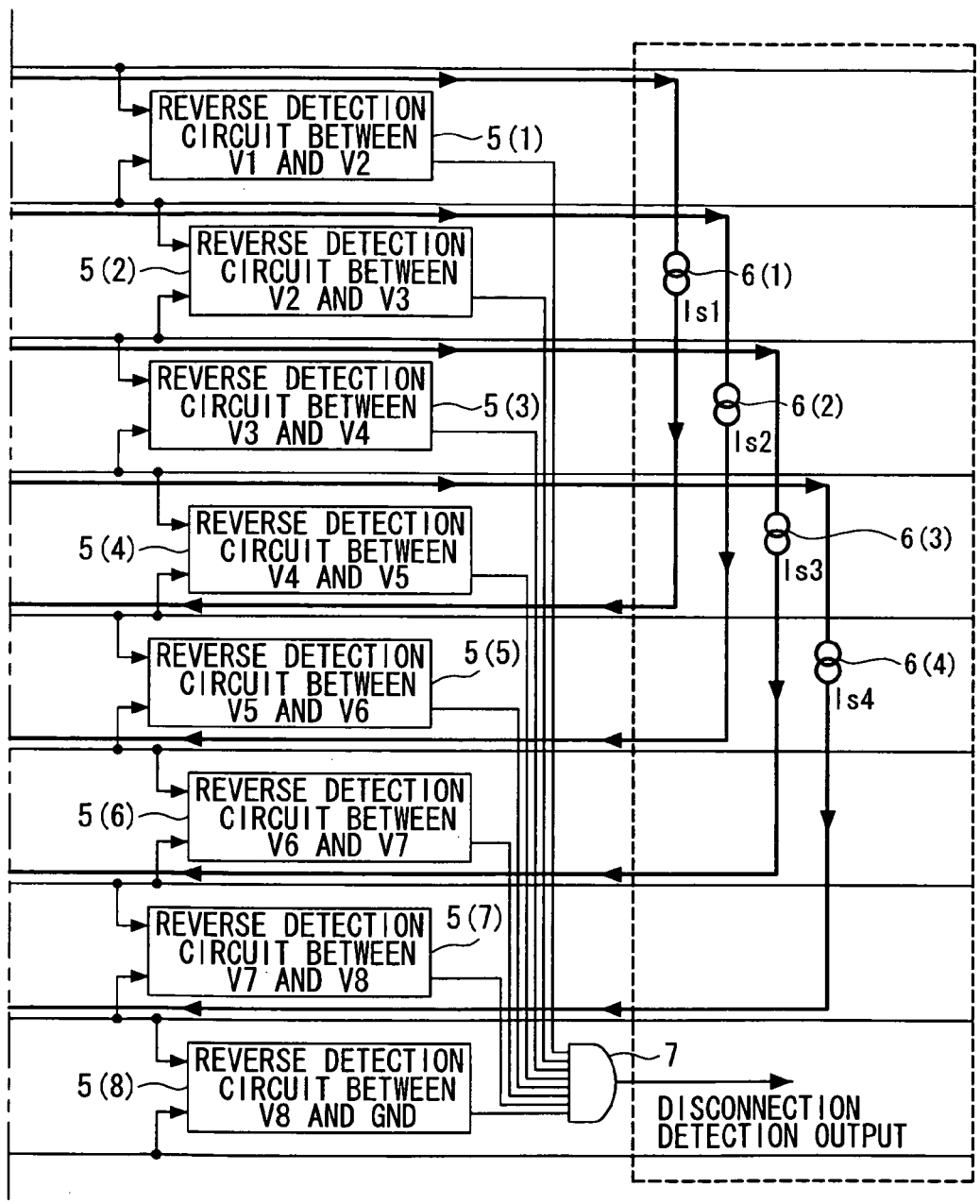

A first embodiment will be explained with reference to FIG. 1 to FIG. 4. FIG. 1 shows the construction of a first embodiment showing a system in which the number of the serial connected secondary battery cells is, for example, eight secondary sections 2(1)-2(8), according to 2(n) wherein n=8. An assembled battery 1, such as a lithium battery, for example, is thus constructed by serially connecting secondary cells 2(1) to 2(8). Voltage monitoring circuits according to 3(n) wherein n=8, or 3(1) to 3(8) are connected in parallel to respective ones of secondary cells 2(1) to 2(8). The voltage monitoring circuits 3(1) to 3(8) monitor a terminal voltage of the corresponding cell 2(1)-2(8) to detect an overcharge state and an over-discharge state or to control the charge/discharge, thus executing equalization processing of the voltage.

Reverse diodes according to 4(n) wherein n=8, or 4(1)-4(8) acting as current route changing means and reverse detection circuits according to 5(n) wherein n=8, or 5(1)-5(8) acting as disconnection detection means are also connected in parallel to the respective cells 2. Further, current control circuits 6 according to 6(n) wherein n=4, or 6(1) to 6(4) for disconnection detection acting as current supplying means for detection of currents Is1 to Is4 are connected in parallel to serial circuits of the four sections of the cells 2(n) such that the respective connection terminals are different.

The connection state of the positive-side terminal to each cell 2(1) to 2(8) is as follows. The upstream side of current control circuit 6(1) is connected to the positive-side terminal of cell 2(1) and the downstream side is connected to the positive-side terminal of cell 2(5); the upstream side of current control circuit 6(2) is connected to the positive-side terminal of cell 2(2) and the downstream side is connected to the positive-side terminal of cell 2(6); the upstream side of current control circuit 6(3) is connected to the positive-side terminal of cell 2(3) and the downstream side is connected to the positive-side terminal of cell 2(7); the upstream side of current control circuit 6(4) is connected to the positive-side terminal of cell 2(4) and the downstream side is connected to the positive-side terminal of cell 2(8).

In a case where the assembled battery 1 is normal without occurrence of the disconnection, current Icc, supplied from the assembled battery 1, flows through eight voltage monitoring circuits 3(1)-3(8) as consumption currents in the voltage monitoring circuits. The current control circuits 6(1)-6(4) operate only at the time of detecting a disconnection of the assembled battery 1 resulting in the supply of detection currents Is1 to Is4. For example, the current control circuit 6(1) supplies the detection current Is1 from a positive-side terminal of the cell 2(1) to a positive-side terminal of the cell 2(5), which, for example, is the same as the negative-side terminal of the cell 2(4). The detection current Is is set to a value larger than consumption current Icc at a normal time.

Although the diode 4, including 4(1) to 4(8), will be described in greater detail hereinafter, in a case where the disconnection occurs in any of the cells 2(1) to 2(8) in the assembled battery 1, the corresponding one of diodes 4(1) to 4(8) acts to reverse an electric potential relation between the positive-side power terminal and the negative-side power terminal of the one of the cells 2(1) to 2(8) by supplying the detection current Is via the diode 4. In addition, when the reverse detection circuit 5, including 5(1) to 5(8), detects a state where the electric potential relation is reversed, the reverse detection circuit 5 outputs a detection signal to an AND gate 7 acting as disconnection detecting means. For example, if the reverse detection circuit 5(1) detects a reverse voltage condition between the positive-side electric potential V1 and the negative-side electric potential V2 of the cell 2(1) and the reverse detection circuit 5(2) detects a reverse voltage condition between the positive-side electric potential V2 and the negative-side electric potential V3 of the cell 2(2), the AND gate 7 acts as OR of negative logic, and outputs a high level indicating an inactive condition unless all the reverse detection circuits 5 detect the disconnection, such as would be present with a complete reversal of the electric potential relation, and changes the output level to a low level indicating an active condition when one or more reverse detection circuits 5 detect the disconnection.

An operation of the present embodiment will be explained with reference to the respective cases where the positions of the cells 2 in which the disconnection occurs are different. Further, terminal voltages V1 to V8 of the respective cells 2 are also used as names for showing the respective positive-side power lines, where V is referred to as a connection line. For example, connection line V1 is the positive-side power line of the cell 2(1), and connection line V2 is the negative-side power line of the cell 2(1), as well as the positive-side power line of the cell 2(2).

With respect to the positive side of the uppermost cell 2(1), in a case where a disconnection of connection line V1 does not occur, when the current control circuit 6(1) supplies detection current Is1, the detection current Is1 flows to the negative-side terminal of the cell 2(4) in a route of connection lines V1 to V5. When connection line V1 is disconnected, the detection current Is1 flows from connection line V2 as the positive-side terminal of the cell 2(2) via the diode 2(1) to connection line V1 where current Id1 flows, as shown in a dashed line. Consequently, a large-small magnitude relation between the voltages V1 and V2 is reversed and therefore, the state is detected from the reverse detection circuit 5(1).

With respect to positive sides of the cells 2(2) to 2(4), in cases where connection lines V2 to V4 are disconnected, for example, assuming a state where connection line V2 corresponding to the cell 2(2) is disconnected, normal consumption current Icc inflows from the upper side through the voltage monitoring circuit 3(1). Since Icc<Is2, the detection current Is2 flows from connection line V3 as the positive-side terminal of the cell 3(3) via the diode 4(2) to connection line V2 at the upper side where current Id2 flows. Consequently, a large-small magnitude relation between the voltages V2 and V3 is reversed and therefore, the state is detected from the reverse detection circuit 5(2). In regard to the other cell 2(3) or 2(4), the disconnection is detected from the reverse detection circuit 5(3) or 5(4) with the similar operation.

With respect to positive sides of the cells 2(5) to 2(8), in cases where connection lines V5 to V8 are disconnected, for example, the detection current Is1 extracted from the positive-side terminal of the cell 2(1) inflows through connection line V5 to the negative-side terminal of the cell 2(4). When connection line V5 is disconnected, the detection current Is1 flows via the diode 4(4) to the positive-side terminal of the cell 2(4) at the upper side where current Id5 flows, shown in a dotted line. Consequently, a large-small magnitude relation between the voltages V4 and V5 is reversed and therefore, the state is detected from the reverse detection circuit 5(4). In a case where connection lines V4 and V5 are disconnected, both of the states are detected by the reverse detection circuit 5(4). In regard to the other cell 2(6) or 2(8), the disconnection is detected by the reverse detection circuit 5(5) or 5(7) with the similar operation.

With respect to the case where GND as the negative side of the lowermost cell 2(8) is disconnected, the detection current Is is not supplied from the current control circuit 6 to the GND line. However, when the GND line is disconnected, the current Icc inflowing through the voltage monitoring circuit 3(8) does not flow to the negative-side terminal of the cell 2(8) and flows via the diode 4(8) to the positive-side terminal of the cell 2(8) where current Idg flows. Consequently, a large-small magnitude relation between the voltage V8 and GND is reversed and therefore, the state is detected by the reverse detection circuit 5(8). In such a case, the disconnection can be detected without operating the current control circuit 6.

Figures 2, 2A:
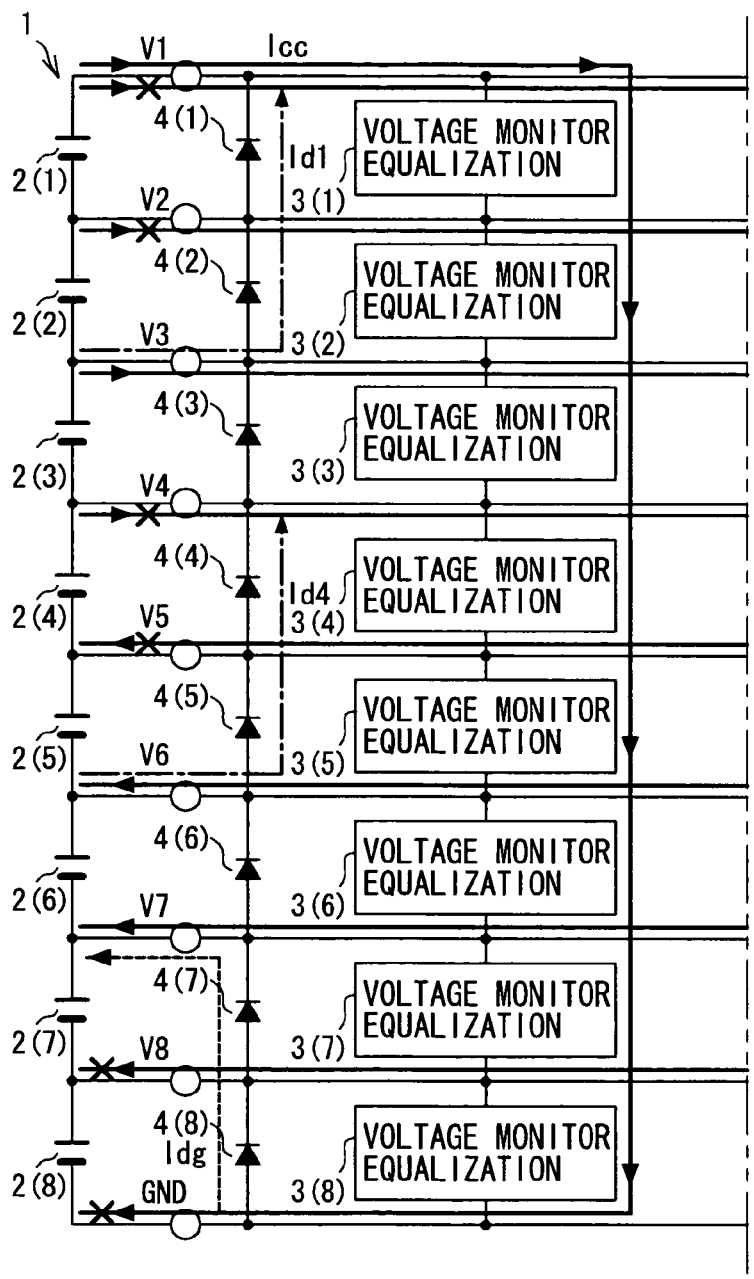
FIG. 2A is a block diagram illustrating an exemplary case where the disconnection occurs in two locations simultaneously.
Figure 2B:
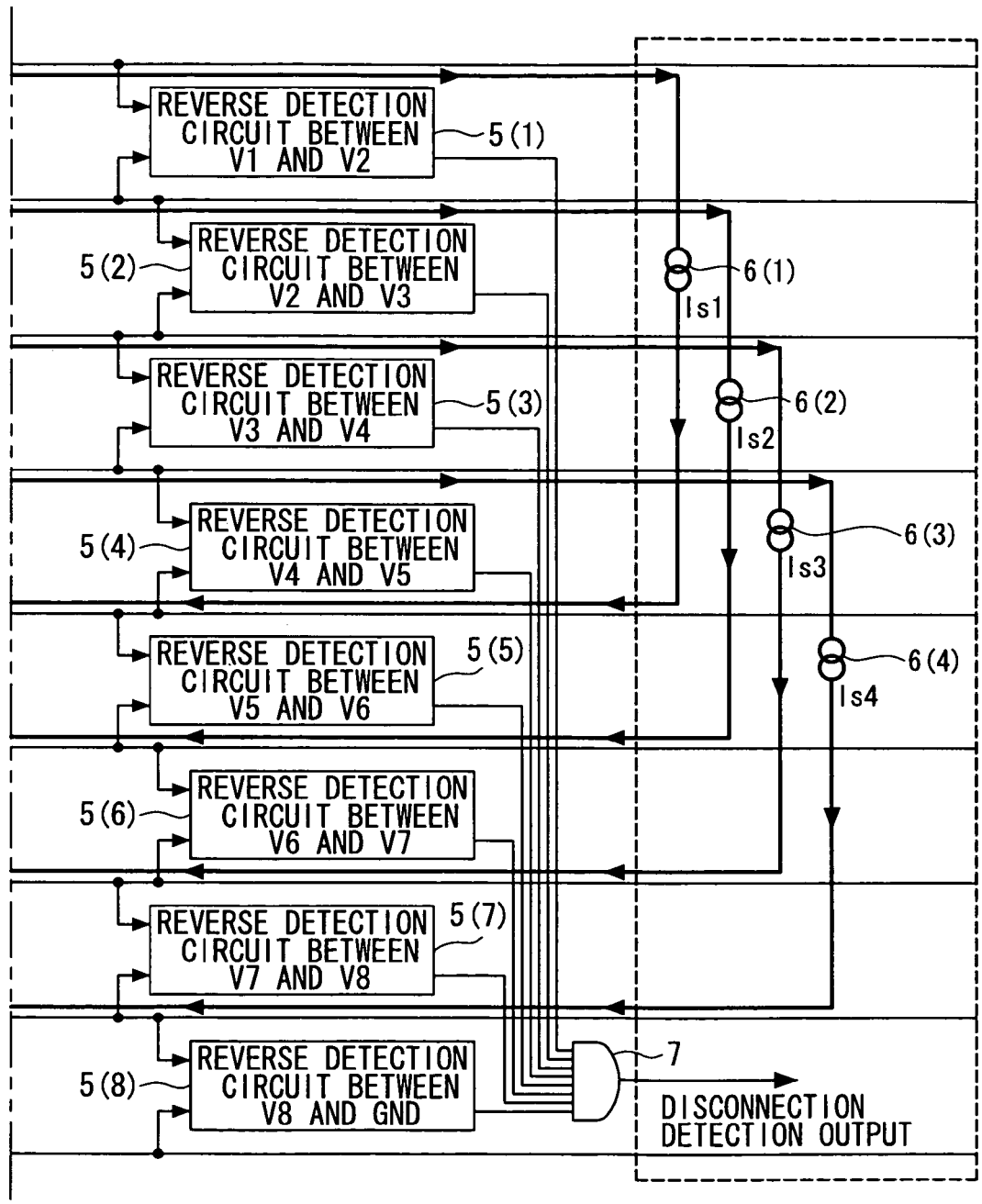
FIG. 2B is a block diagram further illustrating an exemplary case where the disconnection occurs in two locations simultaneously including reverse detection and current control circuit.

With respect to a case where the disconnection occurs in two locations simultaneously, such as a disconnection at connection lines V1 and V2, a description will be provided with reference to FIG. 2. In such a case, when the current control circuit 6(1) supplies the detection current Is1, the detection current Is1 flows from the positive-side terminal of the cell 2(3) via the diodes 4(2) and 4(1) to connection line V1 where current Id1 flows. Consequently, a large-small magnitude relation between the voltages V1 and V2 and a large-small magnitude relation between the voltages V2 and V3 are simultaneously reversed and therefore, each state is detected from the reverse detection circuit 5(1) or 5(2).

In the case of disconnection at connection lines V4 and V5, when the current control circuit 6(4) supplies the detection current Is4, the detection current Is4 flows from the positive-side terminal of the cell 2(6) via the diodes 4(5) and 4(4) to connection line V4 where current Id4 flows. Consequently, a large-small magnitude relation between the voltages V4 and V5 and a large-small magnitude relation between the voltages V5 and V6 are simultaneously reversed and therefore, each state is detected from the reverse detection circuits 5(4) or 5(5).

In the case of disconnection at connection line V8 and GND, the current Icc inflowing through the voltage monitoring circuit 3(8) does not flow to the negative-side terminal of the cell 2(8) and flows via the diodes 4(8) and 4(7) to the positive-side terminal of the cell 2(7) where current Idg flows. Consequently, a large-small magnitude relation between the voltages V7 and V8 and a large-small magnitude relation between the voltage V8 and GND are reversed and therefore, each state is detected by the reverse detection circuits 5(7) or 5(8). Accordingly, the disconnection can be detected without operating the current control circuit 6.

Figures 3, 3A:
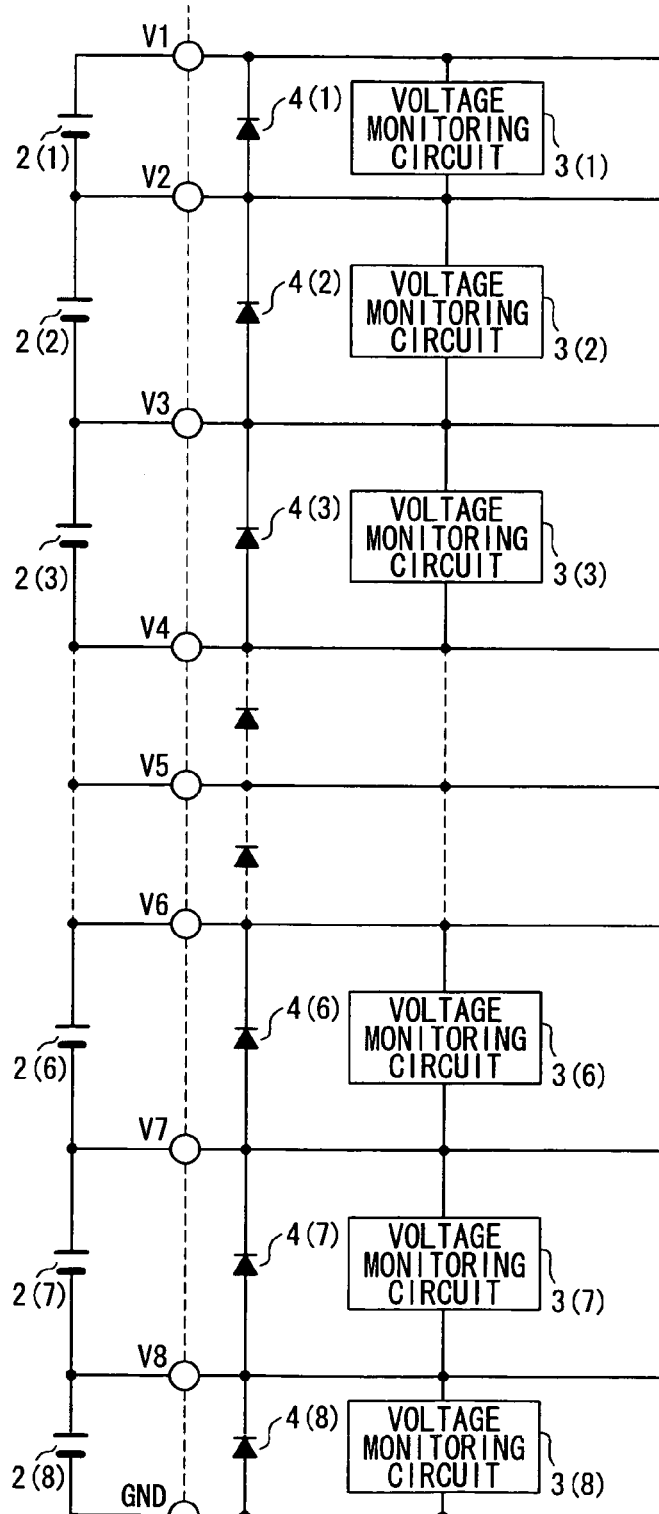
FIG. 3A is a block diagram illustrating a portion of an exemplary detection circuit.
Figure 3B:
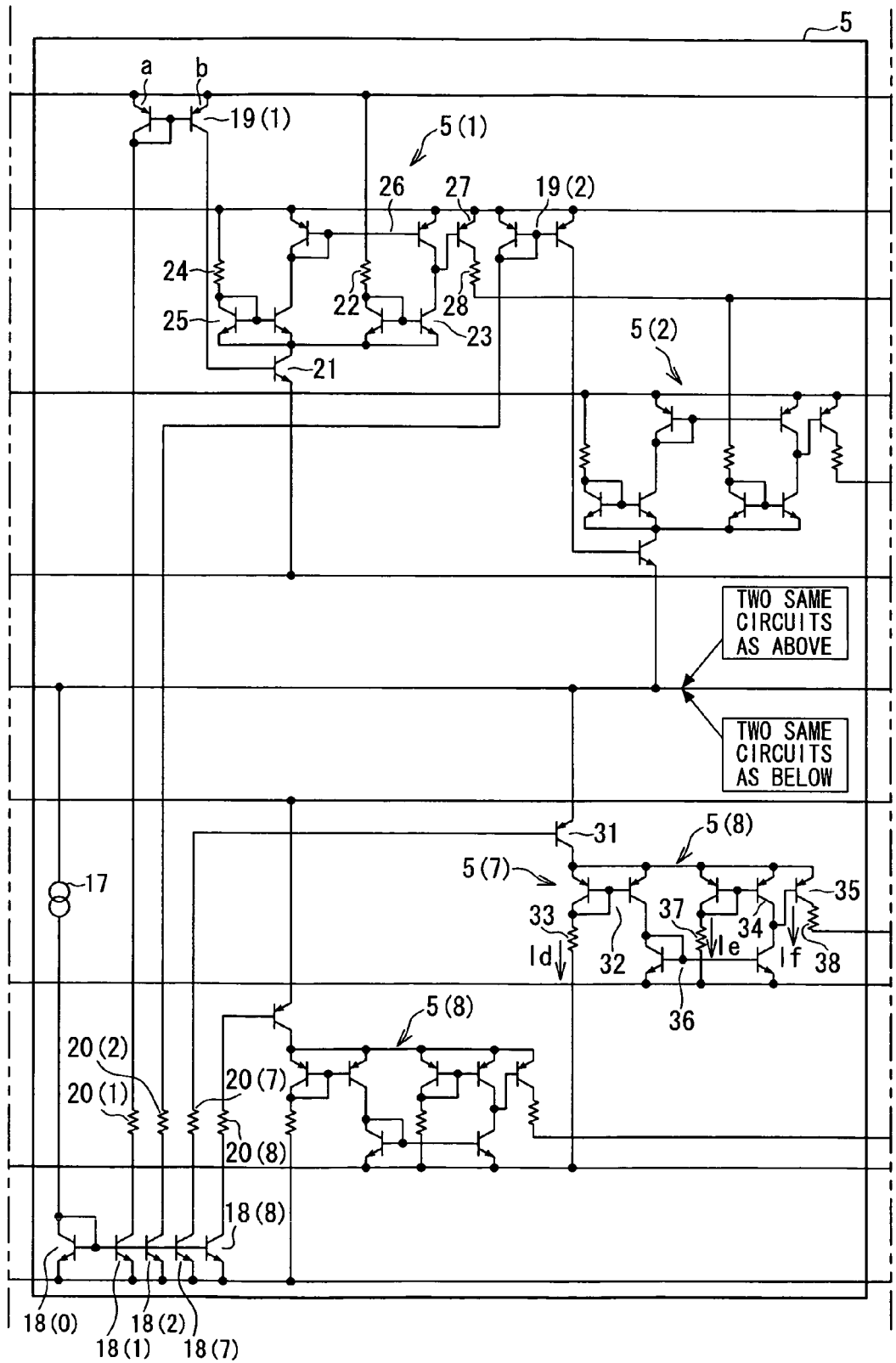
FIG. 3B is a circuit diagram illustrating a specific construction of an exemplary reverse detection circuit.
Figure 3C:
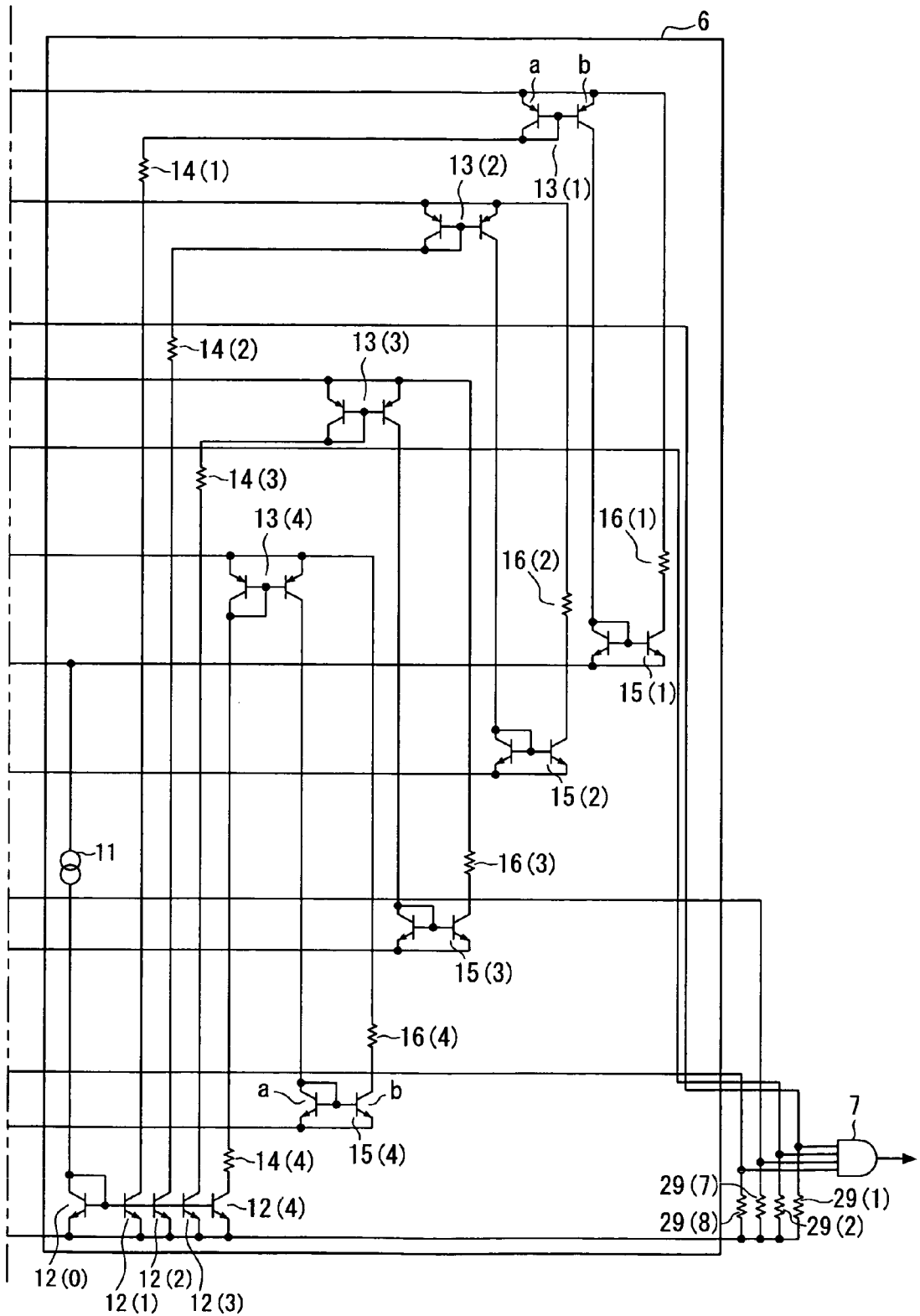
FIG. 3C is a circuit diagram illustrating a specific construction of an exemplary current control circuit.

Next, an exemplary construction of the reverse detection circuit 5 and the current control circuit 6 will be explained with reference to FIG. 3A, FIG. 3B and FIG. 3C. The current control circuit 6 is provided with a serial circuit of a power source 11 and a NPN transistor 12(0) connected between connection line V5 and the GDN line, and four NPN transistors 12(1) to 12(4) forming mirror pairs with the transistor 12(0). Serial circuits in a-sides, which are sides where both bases are connected to the collector, the other side is called b-side of respective transistors 12(1) to 12(4) forming mirror pairs 13(1) to 13(4) of PNP transistors and resistor elements 14(1) to 14(4) are connected between the respective connection lines V1 to V4 and collectors of the transistors 12(1) to 12(4).

Mirror pairs 15(1) to 15(4) of the NPN transistors are constructed in connection lines V5 to V8, the collectors at a-sides of the mirror pairs 15(1) to 15(4) are connected to the collectors at b-sides of the mirror pairs 13(1) to 13(4) and the collectors at b-sides of the mirror pairs 15(1) to 15(4) are connected through the resistor elements 16(1) to 16(4) to connection lines V1 to V4.

The reverse detection circuit 5 is provided with a serial circuit of a power source 17 and an NPN transistor 18(0) connected between connection line V5 and the GDN line, and eight NPN transistors 18(1) to 18(8) forming mirror pairs with the transistor 18(0). However, the transistors 18(3) to 18(6) are omitted for convenience of drawings. Serial circuits of a-sides of respective transistors forming mirror pairs 19(1) to 19(4) of PNP transistors and resistor elements 20(1) to 20(4) are connected between the respective connection lines V1 to V4 and collectors of the transistors 18(1) to 18(4), note that only the mirror pairs 19(1) and (2) are shown.

In the reverse detection circuit 5(1), the base of the NPN transistor 21, which is a transistor for detection, is connected to the collector of the b-side transistor of the mirror pair 19 and an emitter of the transistor 21 is connected to common line V4. An a-side of a mirror pair 23 of a NPN transistor, which is a first current mirror circuit acting as positive-side current changing means, is connected through a resistor element 22 between connection line V1 and the collector of the transistor 21. An a-side of a mirror pair 25 of a NPN transistor, which is a second current mirror circuit acting as negative-side current changing means, is connected through a resistor element 24 between connection line V2 and the collector of the transistor 21.

A mirror pair 26 of a NPN transistor, which is a third current mirror circuit acting as current comparing means, is arranged to connection line V2, a collector of an a-side transistor of the mirror pair 26 is connected to a collector of a b-side transistor of the mirror pair 25, and a collector of a b-side transistor of the mirror pair 26 is connected to a collector of a b-side transistor of the mirror pair 23, which can be referred to as a transistor at the mirror side, and the base of a PNP transistor 27. An emitter of the transistor 27, which is an output transistor, is connected to connection line V2 and a collector of the transistor 27 is connected to the GND line through resistor elements 28 and 29(1). Common connection points of resistor elements 28 and 29 are connected to input terminals of an AND gate 7. The AND gate 8 actually has eight inputs as shown in FIG. 1, but in FIG. 3, portions are omitted for simplicity and therefore only four inputs are shown.

In regard to the reverse detection circuit 5(2), the construction similar to that of the reverse detection circuit 5(1) is arranged between connection lines V2, V3 and V5. In addition, the construction in regard to the reverse detection circuits 5(3) and 5(4) is omitted in the figure.

In a reverse detection circuit 5(7), a serial circuit of a PNP transistor 31, an a-side collector of a mirror pair 32 of a PNP transistor and a resistor element 33 is connected between connection lines V5 and V8. In addition, emitters of a mirror pair 34 of a PNP transistor and a PNP transistor 35 are connected to a collector of a transistor 31. A collector of a b-side of a mirror pair 32 is connected to an a-side collector of a mirror pair 36 of a PNP transistor arranged in connection line V7. A b-side collector of a mirror pair 36 is connected to a b-side collector of a mirror pair 34 and a base of a NPN transistor 35. An a-side collector of the mirror pair 34 is connected through a resistor element 37 to connection line V7 and a collector of the transistor 35 is connected to the GND line through resistor elements 38 and 29(7).

With respect to the reverse detection circuit 5(8), the construction similar to that of the reverse detection circuit 5(7) is arranged between connection line V6 and GND. In addition, the construction of the reverse detection circuits 5(5) and 5(6) is omitted in the figure.

Next, a circuit operation of each of the current control circuit 6 and the reverse detection circuit 5 will be explained. The current control circuit 6 is controlled by a circuit controlling the disconnection detection (not shown), for example, in such a manner that the current source 11 periodically supplies power. Along with it, when the mirror pairs 12, 13 and 15 are operated with power, the current control circuit 6(1) extracts current from connection line V1 and supplies the current to the side of connection line 5 and the current control circuit 6(2) extracts current from connection line V2 and supplies the current to the side of connection line 6.

Figure 4:
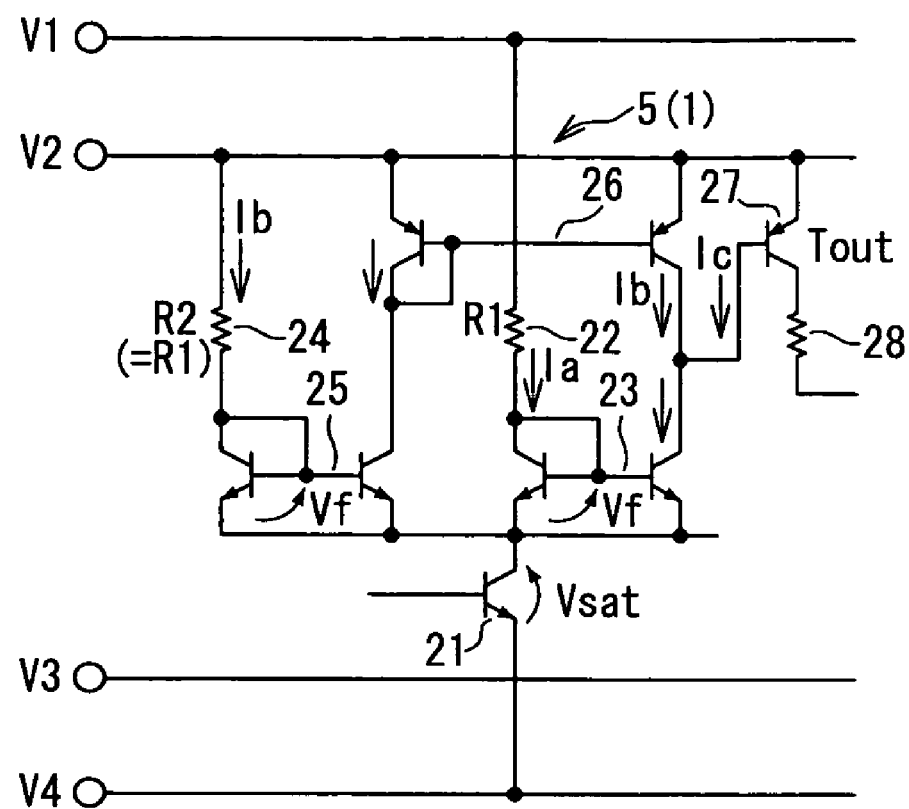
FIG. 4 is a circuit diagram illustrating an exemplary portion of the reverse detection circuit.

On the other hand, a current source 17 constituting the reverse detection circuit 5 is controlled to perform the power supply at the same timing with the current source 11. Then, the mirror pair 18 is operated with power and in regard to the reverse detection circuits 5(1) to 5(4), the mirror pairs 19(1) to 19(4) are operated with power. Here, FIG. 4 shows a part of the reverse detection circuit 5(1) for operational explanation. When the mirror pair 19 is operated, the transistor 21 turns on and mirror pairs 23, 25 and 26 are operated and a collector current Ia, which is a first mirror current as positive-side current, flowing in the a-side of the mirror pair 23 and a collector current Ib, which are a second and third mirror currents as negative-side current, flowing in the a-side of the mirror pair 25 respectively are shown by Equation (1) and Equation (2) as follows.

$$Ia = (V1 - V4 - Vsat - Vf)/R1 \quad (1)$$

$$Ib = (V2 - V4 - Vsat - Vf)/R2 \quad (2)$$

Vsat is a saturation voltage between collector and emitter of the transistor 21, Vf is a voltage between collector and emitter of the transistor constituting the mirror pairs 23 and 25, and R1 and R2 are resistor values of the resistor elements 22 and 24. When R1=R2 in the above Equations (1) and (2), V1>V2→Ia>Ib, and V1<V2→Ia<Ib.

When a base current of a transistor 27 is represented as Ic, since Ic=Ia−Ib, when V1>V2, the transistor 27 turns on and current is supplied to the resistor element 29(1), whereby an input terminal of the AND gate 7 reaches to a high level. On the other hand, when connection line V1 is disconnected, current Id1 flows through the diode 4(1) from connection V2. When a large-small relation of the electric potential is reversed to produce a relation of "V1<V2," the transistor 27 turns off and the current is not supplied to the resistor element 29(1), whereby an output terminal of the AND gate 7 reaches to a low level. That is, the AND gate 7 acts as OR of negative logic.

It should be noted that for explanatory convenience, the resistor values R1 and R2 of the resistor elements 22 and 24 are explained as "R1=R2." However, the operational purpose of the reverse detection circuit 5(1) is that when the electric potential relation is changed to V1<V2, the transistor 27 is made to turn off. A difference in the electric potential reversed due to occurrence of the disconnection is approximately 0.7V as a forward voltage of the diode 4. Therefore, when a magnitude relation of the resistor values R1 and R2 are actually set to "R1<R2," the mirror current Ib can be supplied as a larger current, which is suitable for securely turning off the transistor 27.

The reverse detection circuits 5(5) to 5(8) are basically the same as the reverse detection circuits 5(1) to 5(4). In the reverse detection circuit 5(7), when the mirror pair 18 is operated with power, the transistor 31 turns on and mirror pairs 32, 34 and 36 are operated. When a collector current flowing in the a-side of the mirror pair 32 is represented as Id and a collector current flowing in the a-side of the mirror pair 34 is represented as Ie, the collector currents Id and Ie are shown according to Equations (3) and (4) respectively.

$$Id = (V5 - Vsat - Vf - V8)/R3 \quad (3)$$

$$Ib = (V5 - Vsat - Vf - V7)/R4 \quad (4)$$

Vsat is a saturation voltage between collector and emitter of the transistor 31, Vf is a voltage between collector and emitter of the transistor constituting the mirror pairs 32 and 34, and R3 and R4 are resistor values of the resistor elements 33 and 37. When R3=R4 in the above Equations (3) and (4), V7>V8→Id>Ie V7<V8 Id<Ie.

When a base current of a transistor 35 is represented as If, since If=Id−Ie, when V7>V8, the transistor 35 turns on and current is supplied to a resistor element 29(7), whereby the input terminal of the AND gate 7 reaches to a high level. On the other hand, when V7<V8, the transistor 35 turns off and the current is not supplied to the resistor element 29(7), whereby the output terminal of the AND gate 7 reaches to a low level.

It should be noted that the reason the emitter of the transistor 21 is connected to connection line V4 in the reverse detection circuit 5(1) is to appropriately operate the reverse detection circuit 5(1) even in a case where the reverse in electric potential relation between voltages V3 and V4 occurs.

According to the present embodiment as described above, upon detecting the disconnection, the current control circuit 6 supplies the detection current Is larger than the consumption current Icc flowing via each voltage monitoring circuit 3 at a normal time to connection lines V1 to V8 between the respective cells 2 and the voltage monitoring circuits 3. In addition, when the disconnection occurs, the diode 4 changes a route in which the detection current flows in such a manner as to reverse an electric potential relation between the positive-side and negative-side connection lines of the corresponding cell 2. The reverse detection circuit 5 detects the reverse of the electric potential relation to output a disconnection detection signal. Therefore, the disconnection detection can be performed on a broader condition than conventional. Further, the detection current Is is not supplied to the negative-side connection line of the lowermost cell 2(8), that is, the GND line, but when the disconnection occurs, since the route of the current Icc flowing through the voltage monitoring circuit 3(8) is changed by the diode 4(8), the disconnection detection can be performed in the same way.

According to the present embodiment, when the number n associated with of the battery cells 2 is n=8, four current control circuits 6, 6(1)-6(4) are prepared and are connected in parallel to the serial circuits of the four cells 2 such that the respective connection terminals connected to the cells are different. Therefore, the detection current Is is supplied to the two cells 2 by the single voltage control circuit 6 and the number of the voltage control circuits 6 can be minimized. When all the current control circuits 6 are operated simultaneously, the detection current Is flows to be dispersed to the respective connection lines V1 to V8 without concentration on a specific connection line. Therefore, the entire circuit system can be constructed in a balanced way.

Further, the reverse detection circuit 5 is constructed by the mirror pairs 23, 25 and 26, and the transistor 27, the positive-side and the negative-side voltages of the corresponding cell 2 respectively are converted into the mirror currents Ib and Ia, and the conduction of the transistor 27 is controlled to be made by the current Ic as a difference between the mirror currents Ib and Ia. Therefore, the reverse of the electric potential, that is, the disconnection can be detected by comparing the current value. Since the mirror current is supplied by operating the mirror pairs 23, 25 and 26 by the transistor 21 only in a case where the disconnection detection is performed, the consumption current can be restricted.

Second Embodiment

Figures 5, 5A:
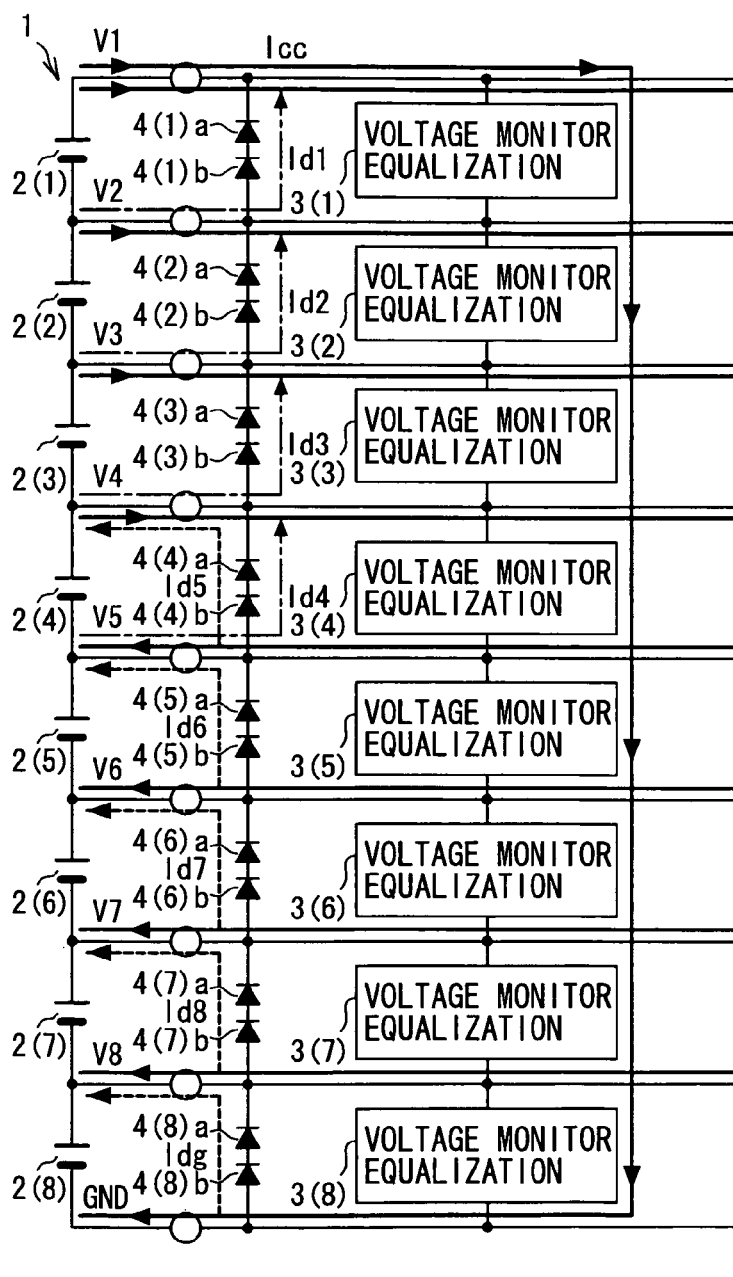
FIG. 5A is a block diagram illustrating an exemplary construction of a disconnection detecting device in accordance with a second embodiment.
Figure 5B:
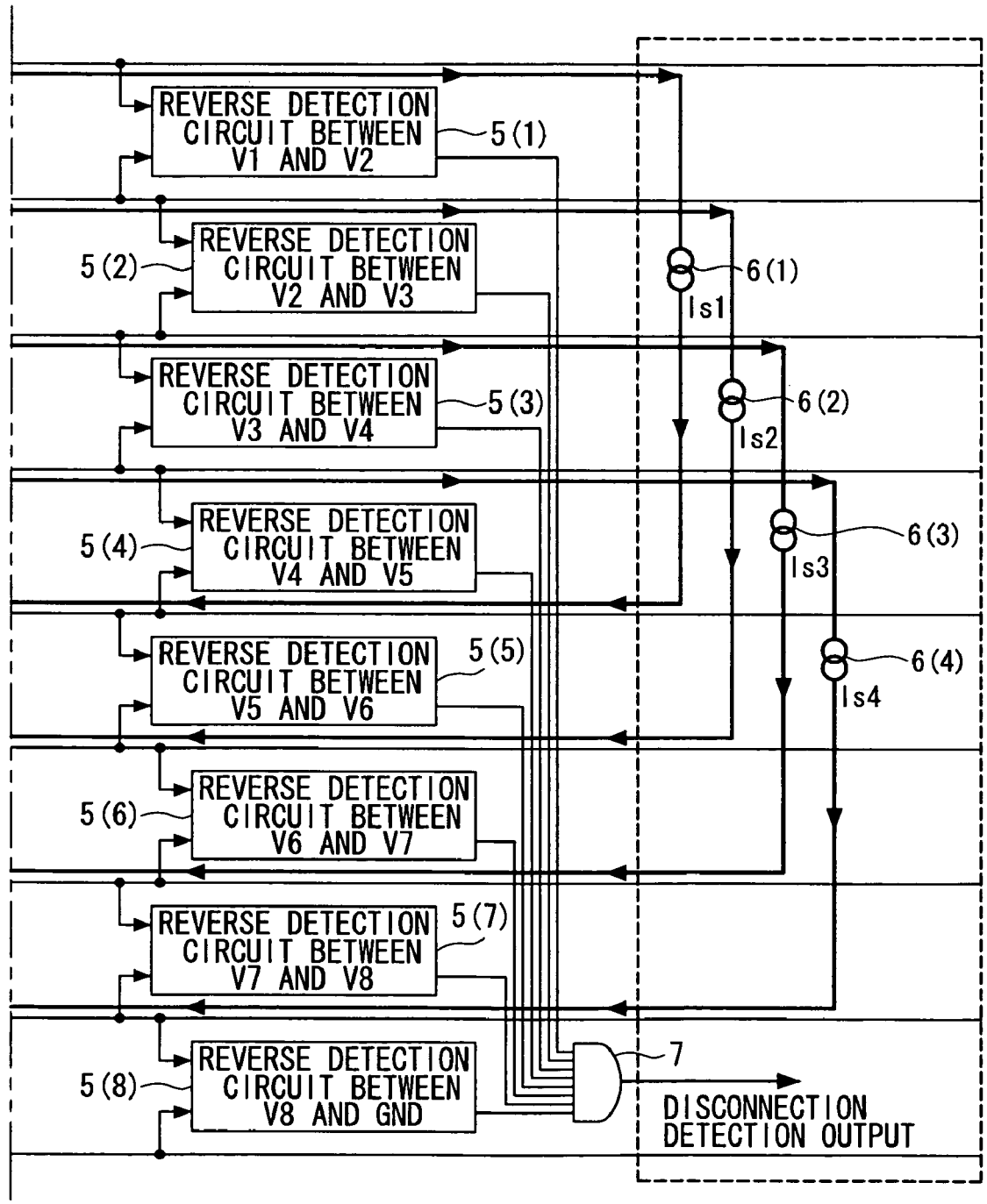
FIG. 5B is a block diagram further illustrating an exemplary construction of a disconnection detecting device including reverse detection and current control circuit a second embodiment.

FIG. 5 shows a second embodiment. Components identical to those in a first embodiment are referred to as identical codes and the explanation is omitted. Hereinafter, different components only will be explained. In a second embodiment, two diodes 4(a) and 4(b) are connected in reverse parallel to each cell 2 and are connected serially with each other and the other construction is the same as in the first embodiment. According to such a second embodiment, in a case where the electric potential relation between the upper-side cell and the lower-side cell is reversed, when the electric potential difference generated is 2Vf, it is possible to more easily perform the reverse detection of the electric potential.

Third Embodiment

Figures 6, 6A, 6B:
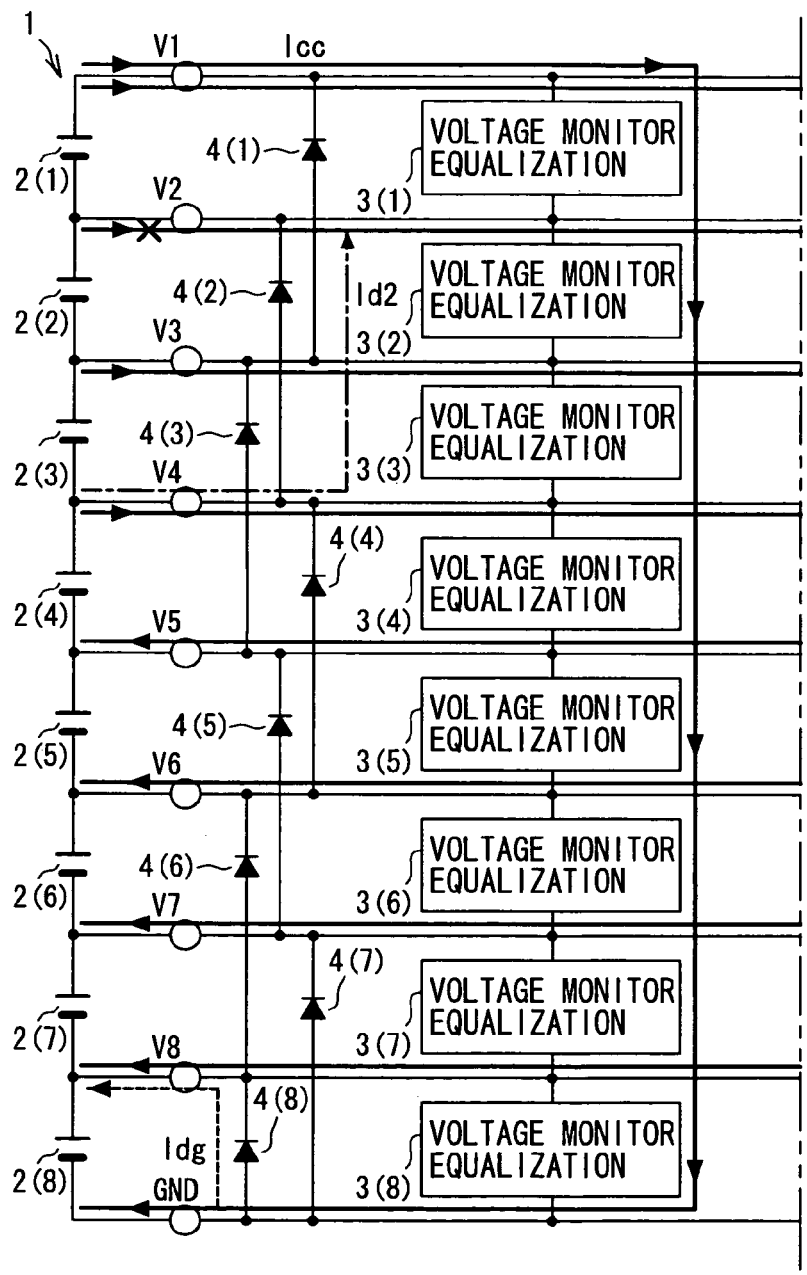
FIG. 6A is a block diagram illustrating an exemplary construction of a disconnection detecting device in accordance with a third embodiment.
FIG. 6B is a block diagram further illustrating an exemplary construction of a disconnection detecting device including reverse detection and current control circuit in accordance with a third embodiment.
Figure 6B:
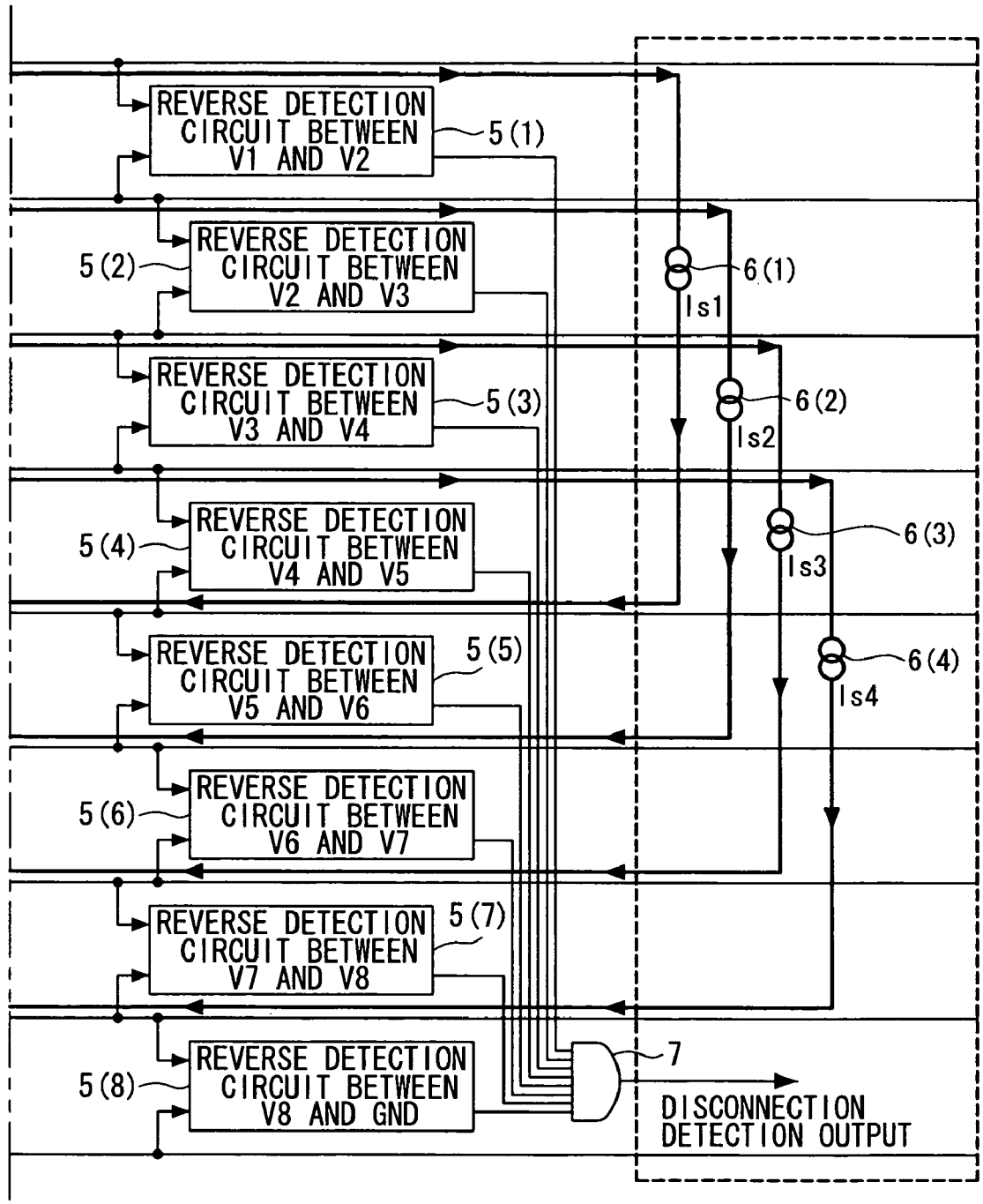

FIG. 6 shows a third embodiment and components different from those in a first embodiment will be explained. In a third embodiment, an anode of each diode 4(1) to 4(7) is connected to the positive-side terminal of each cell 2(2) to 2(8) and the GND line. In the present embodiment, when connection line V2 is disconnected, the detection current Is2 flows from connection line V4 through the diode 4(2) to connection line V2. As a result, the electric potential between voltages V2 and V3 and the electric potential between voltages V3 and V4 are simultaneously detected by the reverse detection circuits 5(2) and 5(3).

Fourth Embodiment

Figures 7, 7A, 7B:
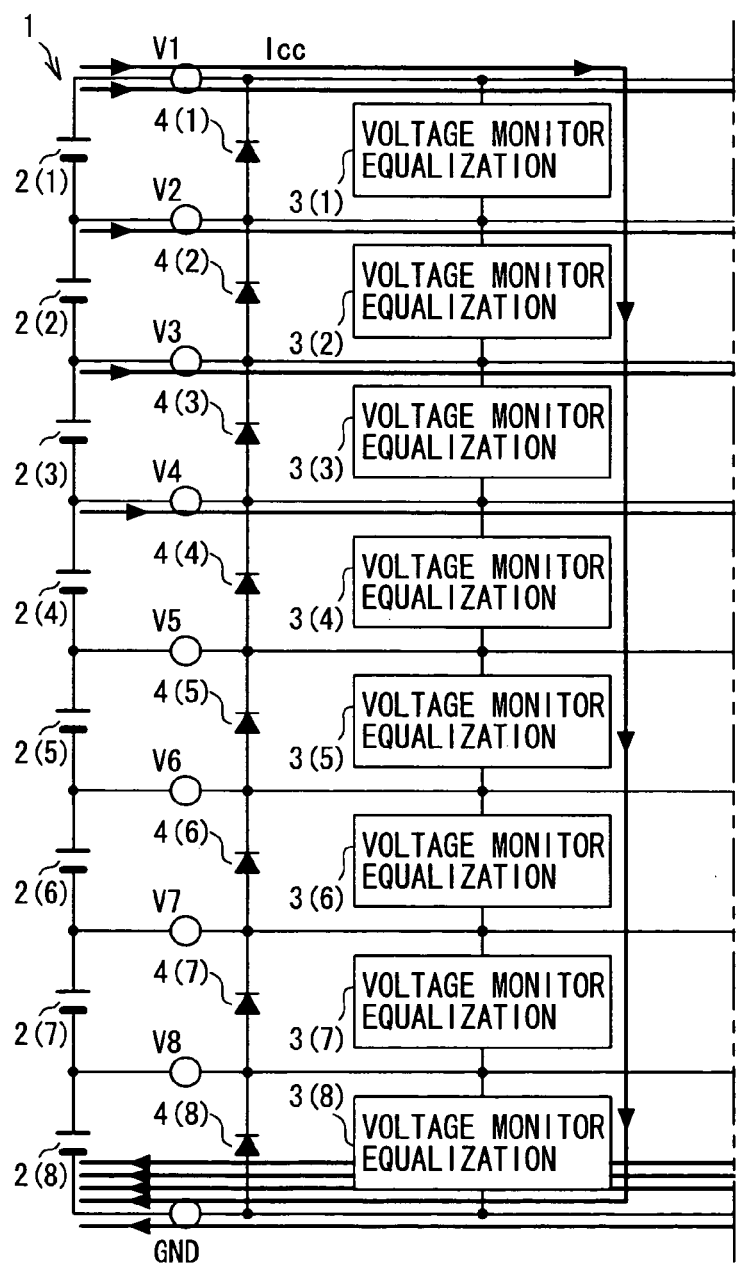
FIG. 7A is a block diagram illustrating an exemplary construction of a disconnection detecting device in accordance with a fourth embodiment.
FIG. 7B is a block diagram further illustrating an exemplary construction of a disconnection detecting device including reverse detection and current control circuit in accordance with a fourth embodiment.
Figure 7B:
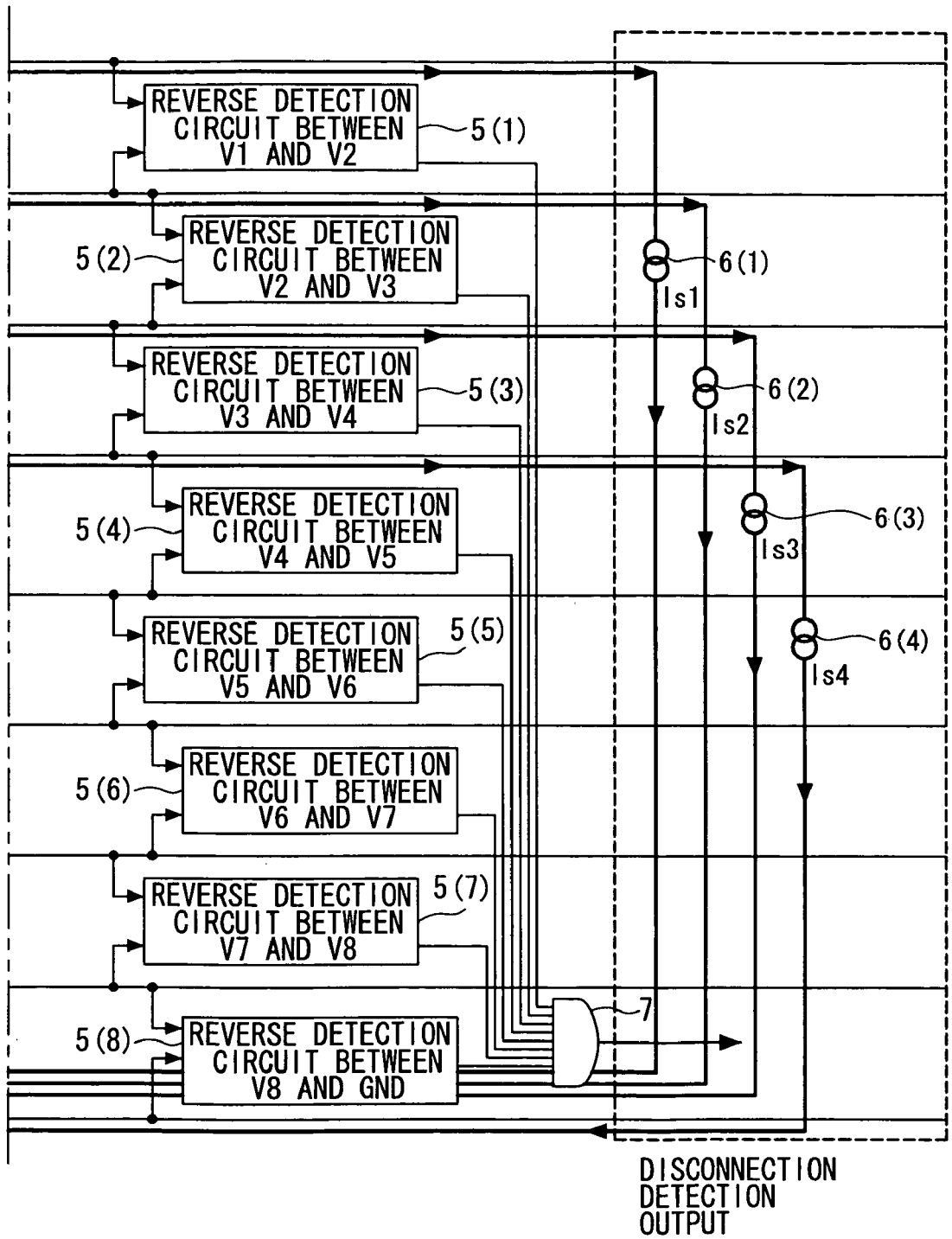

FIG. 7 shows a fourth embodiment and components different from those in the first embodiment will be explained. The fourth embodiment shows a case where all the downstream sides of the current control circuits 6(1) and 6(4) are connected to the GND line. In the present example, under normal conditions, all of detection currents Is1 to Is4, which the current control circuits 6(1) to 6(4) extract from the cells 2(1) to 2(4), flow to the GDN line. Although omitted in FIG. 7, the current control circuits 6(5) to 6(8) corresponding to connection lines V5 to V8 are required to be separately provided in order to detect disconnection of connection lines V5 to V8.

In the fourth embodiment constructed as described above, the disconnection detection in regard to connection lines V1 to V8 connected to the respective cells 2(1) to 2(8) and the GND line can be performed.

Fifth Embodiment

Figure 8A:
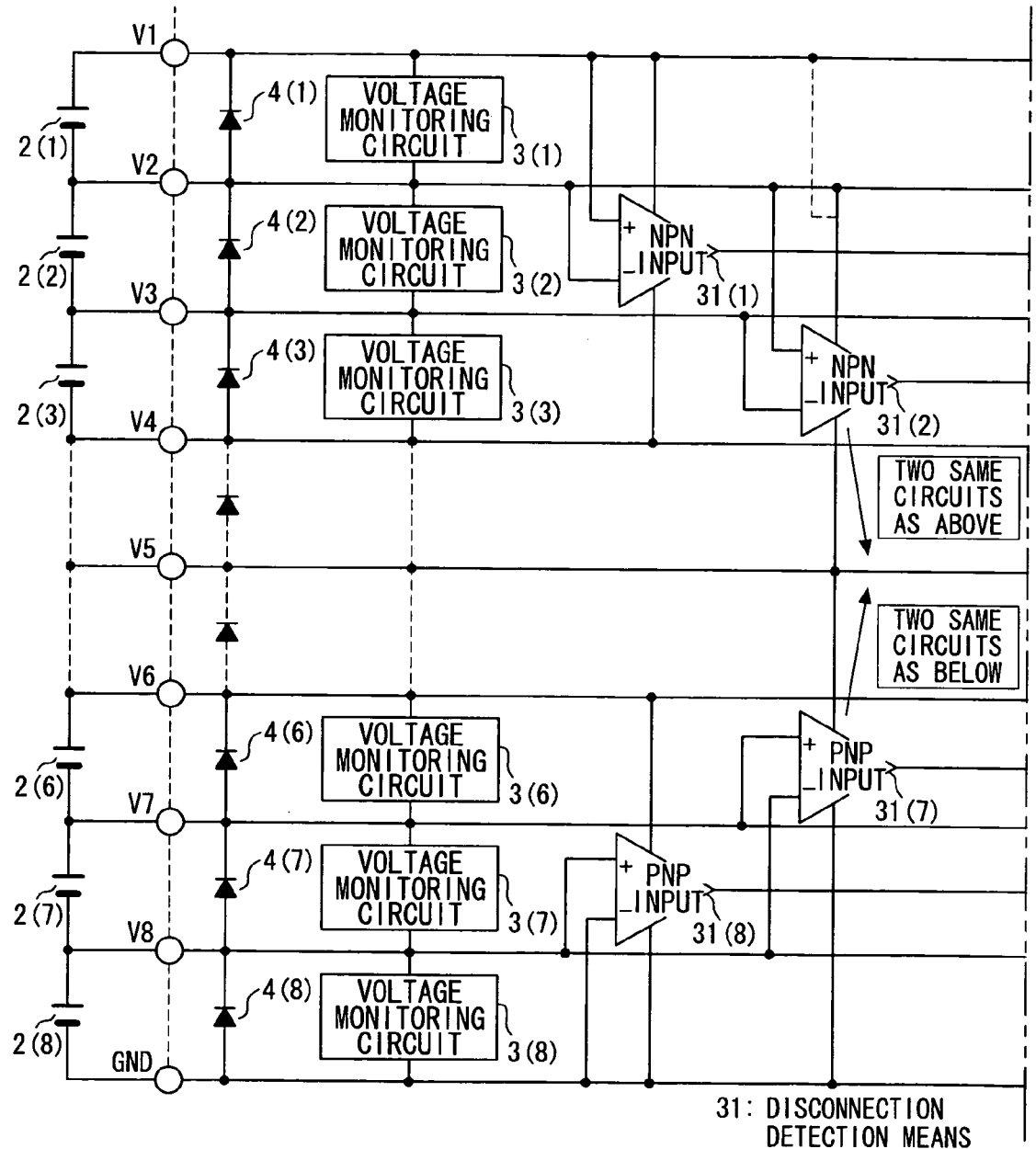
FIG. 8A is a circuit diagram illustrating a disconnection detection device including a disconnection detection means in accordance with a fifth embodiment.
Figure 8B:
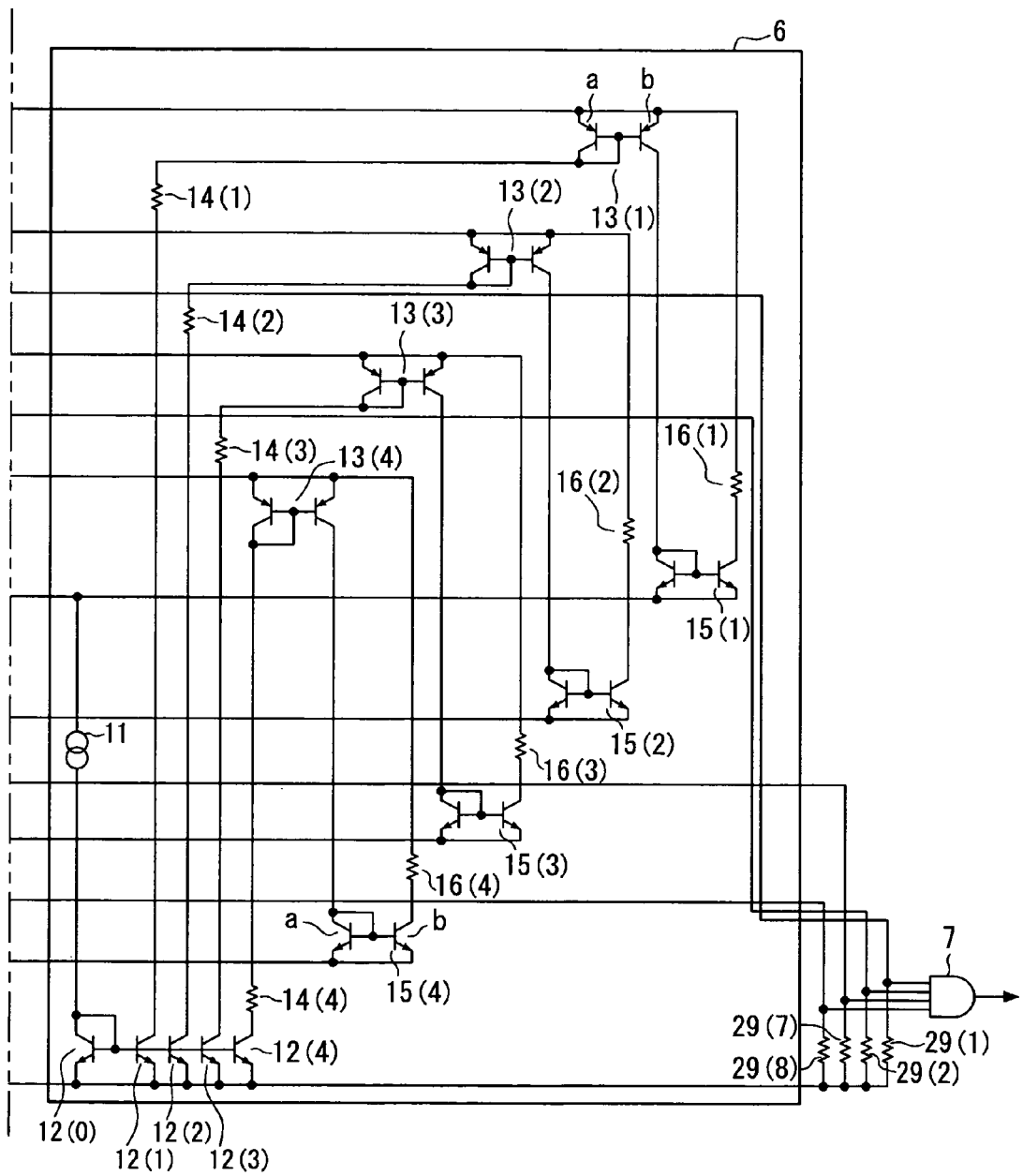
FIG. 8B is a circuit diagram illustrating a specific construction of an exemplary current control circuit in accordance with a fifth embodiment.

FIG. 8 shows a fifth embodiment and components different from those in a first embodiment will be explained. The reverse detection circuits 5(1) to 5(8) in a first embodiment are replaced by comparators acting as disconnection detecting means 31(1) to 31(8). Note however, only comparators 31(1), 31(2), 31(7) and 31(8) are shown). The fifth embodiment adopts the comparators 31(1) to 31(4) corresponding to connection lines V1 to V4 where each input differential pair is formed of a NPN transistor, and the comparators 31(5) to 31(8) corresponding to connection lines V5 to V8 where each input differential pair is formed of a PNP transistor.

Power terminals of "+" and "−" of the comparator 31(1) are connected to respective ones of the connection lines V1 and V4 and power terminals of "+" and "−" of the comparator 31(2) are connected to respective ones of the connection lines V2 and V5. Further, an output terminal of the comparator 31 is connected to the resistor element 29.

Figure 9:
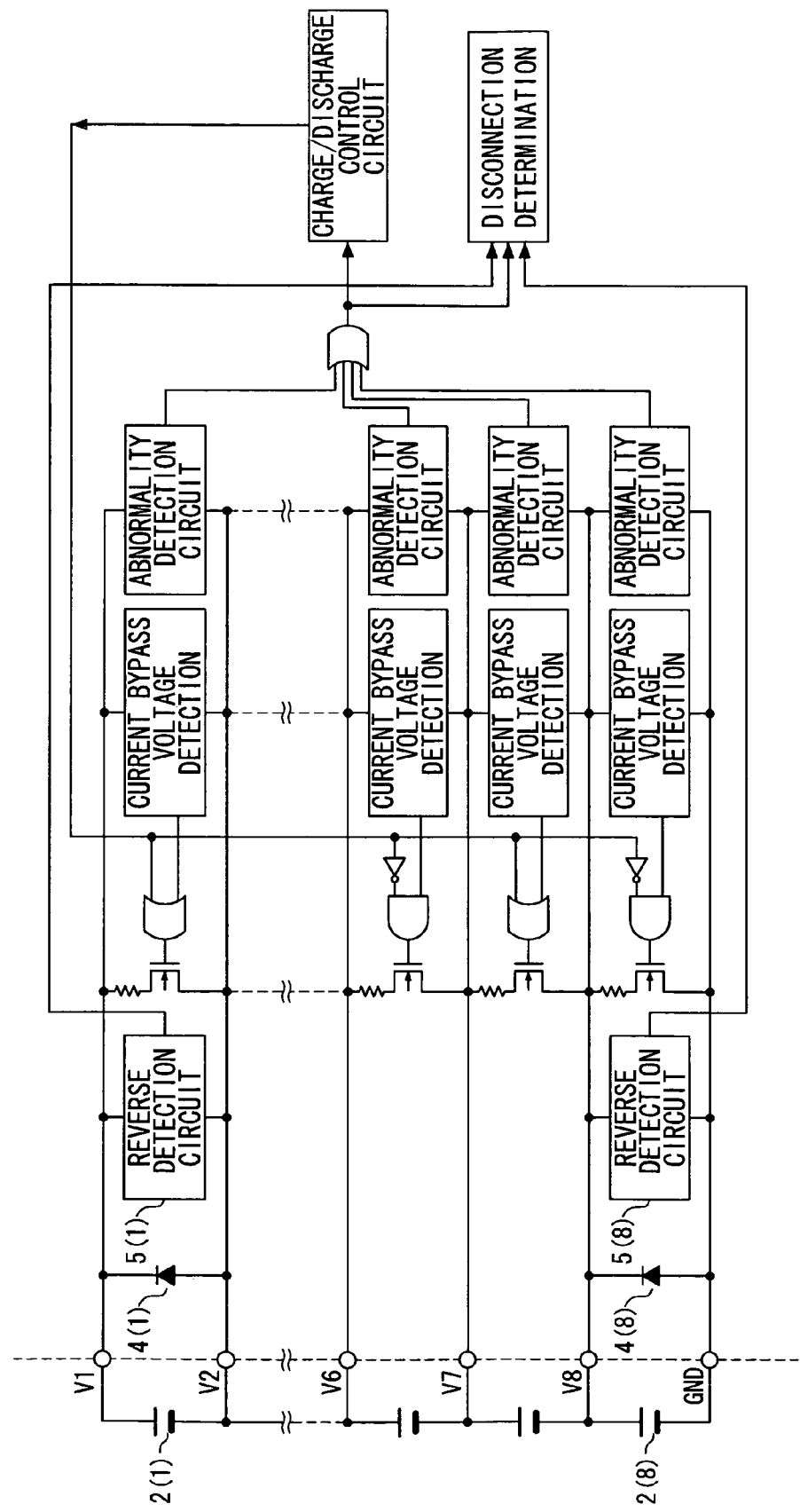
FIG. 9 is block diagram illustrating an exemplary construction of a disconnection detecting device a sixth embodiment.

FIG. 9 shows a sixth embodiment adopting the construction as described in JP 2004-104989A as a basic construction except that the diode 4 and the reverse detection circuit 5 are connected in parallel only to the uppermost cell 2(1) and the lowermost cell 2(8) of the assembled battery 1. In the present embodiment, the current control circuit 6 corresponding to each cell 2(1) and 2(8) is not necessary.

That is, the arrangement in JP 2004-104989A is incapable of detecting disconnection of the uppermost and lowermost power lines in the assembled battery 1. If the disconnection of the uppermost and lowermost power lines could be detected, as in accordance with the present example, by the diodes 4(1) and 4(8) and the reverse detection circuits 5(1) and 5(8), the above problem can be solved.

The present invention is not limited to the embodiment described above and in the figures, but can be modified or broadened as below. For example, in the first embodiment, for example, the emitter of the transistor 21 constituting the reverse detection circuit 5(1) may be connected to connection lines V3, V5 and the like. The transistor 21 may be arranged as needed and in a case of not using the transistor 21, the emitters of the mirror pairs 23 and 25 may be connected directly to the power line V4 or the like.

With regard to the diodes 4 of the second embodiment, three or more diodes 4 may be connected in series. The comparator of the fifth embodiment may be made to a comparator formed of a MOS transistor. The current route changing means is not limited to the diode 4, but also may be formed of a transistor.

With regard to the diode 4, each cathode is required simply to be connected to at least the positive-side terminal of the corresponding cell 2, and the anode may be connected to any location of the lower-side cell 2.

The serial step number of cells constituting the assembled battery is not limited to eight and may be changed as needed in accordance with the individual design.

In addition, the diode 4 and the reverse detection circuit 5 are not necessarily arranged corresponding to all the cells 2.

The monitoring circuit may be required to be provided with at least a function of monitoring charge/discharge of cells.

The disconnection detection may be performed individually, not through the AND gate 7. The secondary battery cell is not limited to a lithium battery.

While only the selected embodiments have been chosen to illustrate the present invention, it will be apparent to those skilled in the art from this disclosure that various changes and modifications can be made therein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A disconnection detection device for detecting disconnection of at least a portion of an assembled battery in an assembled battery system, the disconnection detection device comprising:
   a plurality of secondary battery cells serially connected to form the assembled battery; and
   a plurality of monitoring circuits, ones of which are connected in parallel to respective ones of the plurality of secondary battery cells, each of the plurality of monitoring circuits configured to monitor a charge/discharge state of a corresponding one of the plurality of secondary battery cells, the each of the plurality of monitoring cells including:
   current supplying means for supplying a detection current;
   current route changing means for changing a route in which the detection current flows; and
   disconnection detecting means,
   wherein, when a disconnection occurs:

the current supplying means supplies the detection current larger than a consumption current flowing via the monitoring circuit at a normal state to a connection line between the cell and the monitoring circuit;

the current route changing means changes the route in which the detection current flows so as to generate a reversal of an electric potential relation between a positive-side and a negative-side of the corresponding one of the plurality of secondary battery cells; and the disconnection detecting means detects the reversal of the electric potential relation and outputs a disconnection detection signal.

2. A disconnection detection device according to claim 1, wherein a number of the plurality of secondary cells is n, n being a natural number, and the current supplying means includes n current supply sections connected in parallel to n serial cells.

3. A disconnection detection device according to claim 1, wherein:

the current route changing means includes a diode having a cathode connected to the positive side of the corresponding one of the plurality of secondary battery cells.

4. A disconnection detection device according to claim 1, wherein:

the disconnection detecting means includes:

positive-side current conversion means for converting a voltage of a positive-side power line of the corresponding cell into a positive-side current;

negative-side current conversion means for converting a voltage of a negative-side power line of the corresponding cell into a negative-side current; and current comparing means for comparing a magnitude of the positive-side current with a magnitude of the negative-side current, wherein when the negative-side current is larger than the positive-side current, the disconnection detecting means outputs a disconnection detection signal.

5. A disconnection detection device according to claim 4, wherein:

the positive-side current conversion means includes a first current mirror circuit arranged in a power line side having a lower electric potential than the negative-side power line and in which a first mirror current is determined by current supplied through the positive-side power line;

the negative-side current conversion means includes a second current mirror circuit arranged in a power line side having a lower electric potential than the negative-side power line and in which a second mirror current is determined by current supplied through the negative-side power line; and the current comparing means includes a third current mirror arranged in the negative-power line and in which a third mirror current determined by the second mirror current is supplied to a mirror-side transistor of the first current mirror circuit and an output transistor to which current is supplied from the negative-side power line, wherein the conduction of the output transistor is controlled to be made by current flowing in a common connection point between a transistor constituting the third current mirror circuit and a transistor constituting the first current mirror circuit.

6. A disconnection detection device according to claim 5, further comprising:

a detection transistor provided between the first and second current mirror circuits, and a power line having a lower electric potential than the negative-side power line, and controlled to provide electrical conduction in a case of performing the disconnection detection.

* * * * *